United States Patent [19]

Suzuki et al.

[11] 4,244,238
[45] Jan. 13, 1981

[54] REMOTE CONTROL WIRE APPARATUS

[75] Inventors: Masato Suzuki, Okazaki; Yasushi Mima; Kentaro Okamoto, both of Toyota, all of Japan

[73] Assignee: Toyota Jidosha Kogyo Kabushiki Kaisha, Toyota, Japan

[21] Appl. No.: 3,470

[22] Filed: Jan. 15, 1979

Related U.S. Application Data

[63] Continuation of Ser. No. 777,951, Mar. 16, 1977, abandoned.

[30] Foreign Application Priority Data

Dec. 17, 1976 [JP] Japan .................. 51-169891

[51] Int. Cl.³ .............................................. F16C 1/10
[52] U.S. Cl. ............................ 74/501 R; 74/501.5 R
[58] Field of Search ............. 248/316 D; 24/131 R, 24/131 C, 129; 403/229; 74/501.5 R, 501 R, 511 R, 511 A, 501 M, 501 P, 502

[56] References Cited

U.S. PATENT DOCUMENTS

| | | | |
|---|---|---|---|
| 1,013,410 | 1/1912 | Lynch | 403/229 |
| 1,784,679 | 12/1930 | Paterson | 24/129 C |
| 1,876,731 | 9/1932 | Neate | 74/501 |
| 2,282,600 | 5/1942 | Blanc | 74/511 A |
| 2,494,881 | 1/1950 | Kost | 248/316 D |
| 2,496,158 | 1/1950 | Greenleaf | 403/229 X |
| 2,497,225 | 2/1950 | Lerch | 403/229 X |
| 3,073,565 | 1/1963 | Daumy | 74/501 R |
| 3,150,539 | 9/1964 | Wallis, Jr. | 74/501 R |
| 3,163,054 | 12/1964 | Werner | 74/501 X |
| 3,190,140 | 6/1965 | Werner | 74/501 R |
| 3,216,685 | 11/1965 | Raymond | 248/316 D |
| 3,275,029 | 9/1966 | Wellman | 74/502 |
| 3,397,420 | 8/1968 | Schneider | 403/229 X |
| 3,513,718 | 5/1970 | Tomecek | 74/501 R |
| 3,587,341 | 6/1971 | Fiddler | 74/502 |

FOREIGN PATENT DOCUMENTS 1133424 3/1957 France .................. 403/229

*Primary Examiner*—Leslie Braun
*Attorney, Agent, or Firm*—Koda and Androlia

[57] ABSTRACT

A remote control wire apparatus including a control wire, a coil spring formed in at least one end of the control wire and a socket for mounting on a working part or a control part and for locking engagement with the coil spring whereby a simple adjustable connection is made between the control wire and the working part or the control part.

7 Claims, 6 Drawing Figures

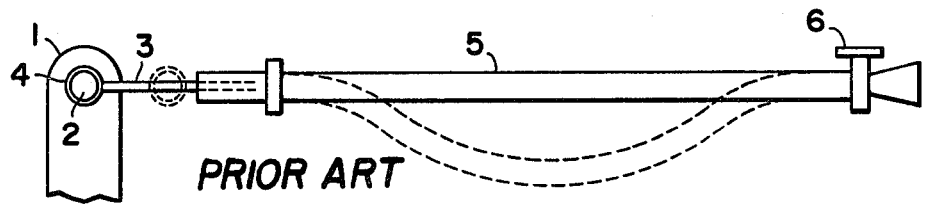
FIG. 1 PRIOR ART
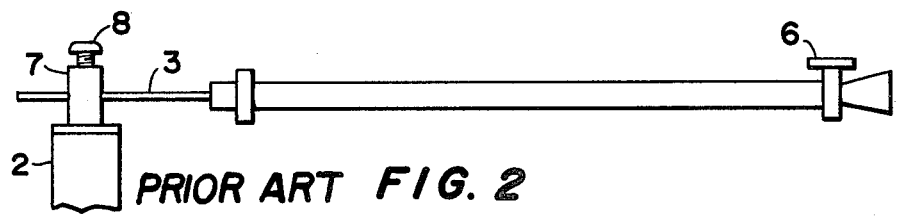
PRIOR ART FIG. 2
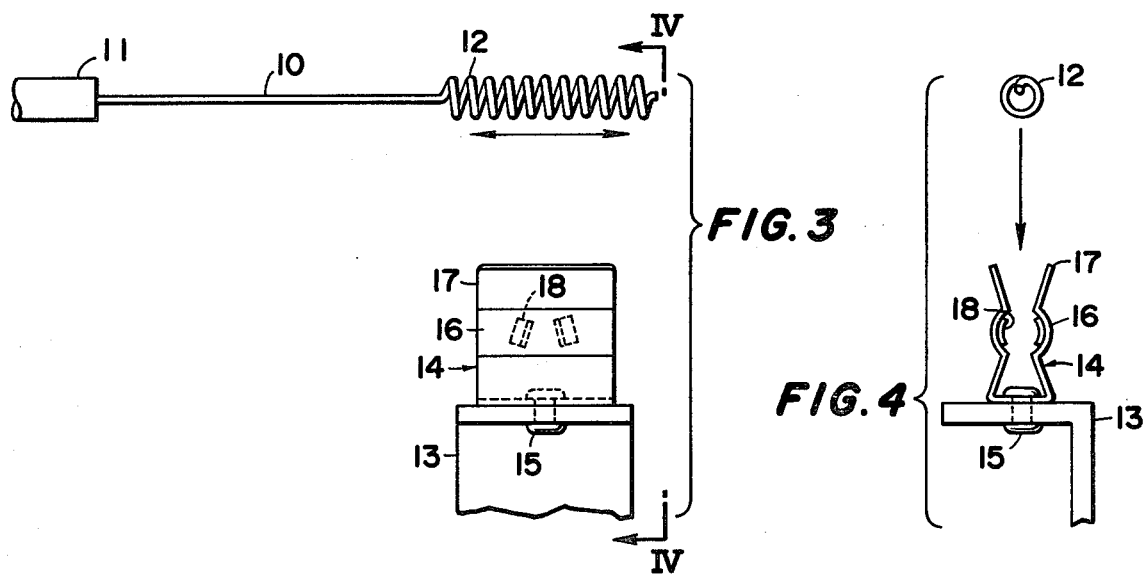
FIG. 3
FIG. 4
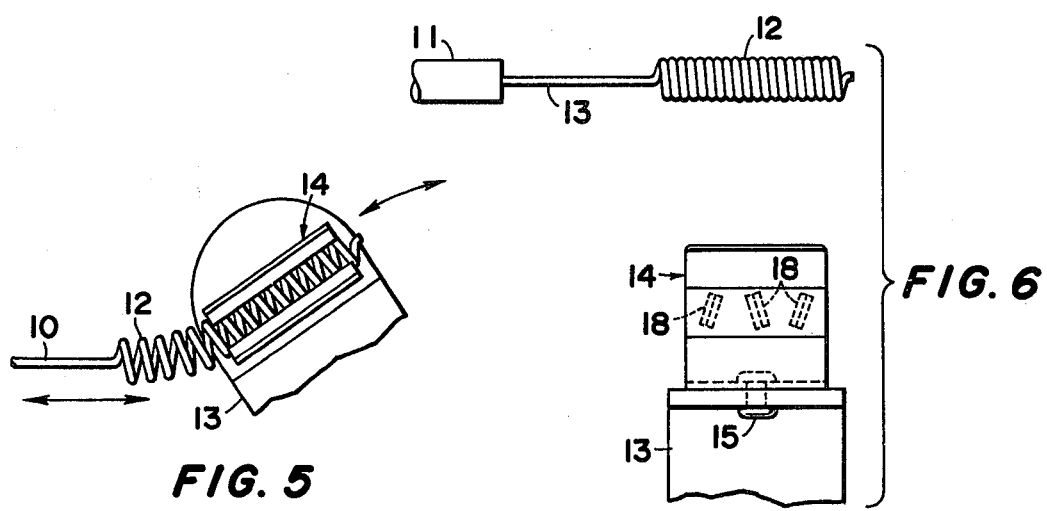
FIG. 5
FIG. 6

REMOTE CONTROL WIRE APPARATUS

This is a continuation of application Ser. No. 777,951 filed Mar. 16, 1977 now abandoned.

BACKGROUND OF THE INVENTION

1. Field of Invention

This invention relates to remote control wire apparatuses and in particular the connection means between a remote control wire and a working part.

2. Prior Art

In the prior art there are several remote control wire apparatuses. Shown in FIGS. 1 and 2 are two such prior art remote control wire apparatuses.

In FIG. 1, the remote control wire device is connected to the working part 1 by putting the eye of the remote control wire 3 over a pin 2 which projects from working part 1. In such a remote control wire apparatus the position of the control part 6 and the working part 1 are predetermined. The control wire is adjusted by changing the position of the guide 5. That is, if the control wire 3 is too long, the remote control wire is attached with the guide 5 in a slackened condition, as shown by the broken line. This slackened condition of the guide 5 is undesirable. In addition, such prior art remote control wire apparatuses have several other defects, such as, for example: (1) it is difficult to use in places where it is necessary that it be used linerally, (2) it is difficult to use where the distances between the control part 6 and the working part 2 are short, and (3) it is necessary to preset the length of the control wire 3 so that it is slightly in excess of the length required for installation.

Referring to FIG. 2, shown therein is a remote control wire device which is proposed to overcome the drawbacks of the remote control wire apparatus of FIG. 1. In FIG. 2, the tip portion of the control wire 3 is inserted through a clamp 7 on the working part 2 and is fixed in the clamp 7 by a screw 8 at any arbitrary position. In this way, the prior art apparatus of FIG. 2 can be adjusted for variations in distance between the control part 6 and the working part 2. Even though the remote control wire apparatus of FIG. 2 overcomes most of the drawbacks of the apparatus of FIG. 1, it too has its own defects. Such defects include: (1) increased cost as a result of an increased in parts, (2) too much time is required for adjustment and tightening (3) the apparatus is difficult to work with and is therefore hard to adopt for use in narrow places.

SUMMARY OF THE INVENTION

Accordingly, it is a general object of the present invention to provide a remote control wire device whose fitting and adjustment can be easily accomplished.

It is another object of the present invention to provide a remote control wire apparatus which can be used in narrow places.

It is still another object of the present invention to provide a remote control wire apparatus which is low in cost.

In keeping with the principles of the present invention, the objects are accomplished by a unique remote control wire apparatus which includes a control wire, a coil spring formed at one end of the control wire and a socket for mounting on a working member and for locking engagement with the coil spring whereby a simple adjustable connection is made between the control wire and the working member.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which:

FIG. 1 is a front view of a conventional remote control wire apparatus;

FIG. 2 is a front view of a second conventional remote control wire apparatus;

FIG. 3 is a front view of a remote control wire apparatus in accordance with the teachings of the present invention in a disassembled condition;

FIG. 4 is a view in the direction indicated by the arrows IV—IV in FIG. 3;

FIG. 5 is a plan view showing the essential points of operation of a second embodiment of the present invention; and FIG. 6 is a disassembled front view showing a third embodiment of a remote control wire apparatus in accordance with the teachings of the present invention.

DETAILED DESCRIPTION OF THE INVENTION

Referring more particularly to the drawings, shown in FIG. 3 is a front view illustrating a remote control wire apparatus in accordance with the teachings of the present invention and FIG. 4 is a view in the direction of the arrows from the line IV—IV in FIG. 3. As shown in FIGS. 3 and 4, a coil spring 12 is formed at the tip of the control wire 10 projecting from the guide 11.

A socket 14 is rotatably coupled to a member 13 by a pivot pin 15. Pivot pin 15 is the axis of rotation of socket 14 and the axis of rotation is perpendicular to control wire 10. Socket 14 is substantially the same length as coil 12 and is made from a spring plate shaped so that two opposing sides will clasp the coil 12. A pair of opposing bent portions 16 are formed in the central part of the vertical section in a circular arc and coincide with th external shape of coil 12. The socket 14 further includes a pair of guides which flange upward from the bent portions 16 and guide the coil 12 into the bent portions 16.

Clasping projections 18 are provided within the bent portions 16 and are inclined parallel to the pitch of the coil 12. When coil 12 is pinched between bent portions 16, clasping projections 18 engage with the coil winding. The clasping projections 18 can be formed economically in bent portions 16 if they are cut and opened up.

In operation, when the control wire 10 is to be connected to the socket 14, the control wire 10 is kept in an extended position and pushed into the guides 17 of the socket 14 until it snaps into the bent portions 16. Since the socket 14 is made of a spring material, pushing down the coil 12 forces open the lower end of guides 17 and fits the coil 12 into the more, the coil 12 is securely held in position in the socket 14 by the clasping projections 18. The connection between the coil 12 and the socket 14 can be easily accomplished and can be done utilized only the fingertips of one hand.

Referring to FIG. 5, shown therein is a second embodiment of the present invention. In FIG. 5 the socket 14 and the companion part 13 are rigidly fastened together. The length and position of coil 12 are fixed so that the control wire 10, which includes the coil 12, bends easily a part of the coil 12 always projects from the socket 14 toward the control part. That is, the part of the coil 12 which projects from the socket 14 is able to bend as shown in FIG. 5. In this embodiment it is not required that the axis of the socket 14 be perpendicular to the control wire 10.

Even though in the previous embodiments the coil 12 is wound with an open spacing, it is permissible to tightly wind the coil 12 as shown in FIG. 6. In the embodiment of FIG. 6 the clasping projections 18 fit into the spaces between the coil's windings.

It should be apparent to one skilled in the art that it is possible to also wind the coil 12 even more open than is shown in FIG. 3. Varying the pitch of the coil 12 enables the adjustment interval of attachment to the socket 14 to be varied. Accordingly, the adjustment intervals can be adjusted as desired in the design stage.

Furthermore, it should be apparent to one skilled in the art that the opposing pairs of clasping projections 18 need not be formed in pairs and the use of a single clasping projection 18 is possible. As shown in FIG. 6, three clasping projections 18 are utilized; but in the normal case a large number of clasping projections 18 are utilized. Since a large number of clasping projections 18 are utilized which can engage the coil 12, the effect is a lengthening of the control wire's adjustment life. In addition, even though the above description is in terms of the socket 14 having bent portions 16 which clasp the coil 12, it should be apparent that if the spring action holding power of the socket 14 is sufficient, it is not necessary for the bent portions 16 to have a shape which conforms to the coil's external shape.

As described above, the remote control wire apparatus provided by this invention includes not only a coil at the end of the remote control wire but also a socket which is provided as an interlocking companion part and into which the coil 12 is inserted into any position along the coil's axis. Since the control wire can be adjusted and attached by merely pushing the coil into the socket, the adjustment and fitting of the control wire is easy. Since it is so easy to attach the control wire, a remote control wire apparatus in accordance with the teachings of the present invention is easy to use in a narrow space and an installer can manipulate it easily without having to be very skillful. Furthermore, in some cases in very narrow places it is even possible to work by feel. In addition to the above described advantages, the remote control wire apparatus in accordance with the teachings of the present invention also allows the adjustment period to be freely determined by changing the coil pitch and also provides an attachment means which is very low in cost to manufacture.

In all cases it is understood that the above described embodiments are merely illustrative of but a few of the many possible specific embodiments which can represent the applications of the principles of the present invention. Numerous and various other arrangements can be readily devised by those skilled in the art without departing from the spirit and scope of the invention.

It is claimed:

1. A remote control wire apparatus comprising:
   a guide;
   a control wire projecting from said guide;
   an expandable coil formed at at least one end portion of said control wire projecting through said guide;
   an open socket substantially U-shaped in cross-section maintained in locking engagement with an exterior of said coil, said socket being made from resilient material, said socket also having at least one clasping projection which engages with the winding of said coil thereinbetween, said socket further rotatably supported by a pivot pin extending through a base of said U-shaped socket perpendicular to an axis of said control wire, said socket further being shorter than said coil in length; whereby a simple adjustable connection is made between said control and wire and said socket.

2. A remote control wire apparatus according to claim 1 wherein said socket further comprises at least one pair of clasping projections.

3. A remote control wire apparatus according to claim 1 wherein said socket further comprises a pair of opposing bent portions formed in said opposing sides, said bent portions have a circular shape which is substantially the same as that of said coil spring.

4. A remote control wire apparatus according to claim 3 wherein said socket further comprises at least one clasping projection formed in at least one of said bent portions.

5. A remote control wire apparatus according to claim 3 wherein said socket further comprises at least one opposing pair of clasping projections formed in said bent portions.

6. A remote control wire apparatus according to claim 3 wherein said socket further comprises a plurality of opposing pairs of clasping projections formed in said bent portion and a pair of guides which flange outwardly from said bent portions.

7. A remote control wire apparatus according to claim 1, wherein said clasping projection is placed parallel to the pitch of said coil.

* * * * *